(12) United States Patent
Su et al.

(10) Patent No.: US 12,360,617 B1
(45) Date of Patent: Jul. 15, 2025

(54) ROLLER MODULE

(71) Applicant: Primax Electronics Ltd., Taipei (TW)

(72) Inventors: Chun-Nan Su, Taipei (TW); Chun-Che Wu, Taipei (TW); Kai-Wen Lee, Taipei (TW); Chien-Pang Chien, Taipei (TW); Li-Kuei Cheng, Taipei (TW); Shao-Ju Yen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 18/898,362

(22) Filed: Sep. 26, 2024

(30) Foreign Application Priority Data

Aug. 28, 2024  (TW) .................................. 113132442

(51) Int. Cl.
    *G06F 3/0362*  (2013.01)
(52) U.S. Cl.
    CPC .................................. *G06F 3/0362* (2013.01)
(58) Field of Classification Search
    CPC ..................................................... G06F 3/0362
    See application file for complete search history.

(56) References Cited

U.S. PATENT DOCUMENTS

| | | | | |
|---|---|---|---|---|
| 2,717,675 A | * | 9/1955 | Smith | F16D 27/01 192/105 A |
| 5,691,587 A | * | 11/1997 | Lamb | H02K 49/046 310/75 D |
| 8,040,331 B2 | * | 10/2011 | Hill | G06F 3/03543 345/184 |
| 11,099,667 B1 | * | 8/2021 | Cheng | G06F 3/0362 |
| 11,567,591 B1 | * | 1/2023 | Su | G06F 3/03543 |
| 2007/0188453 A1 | * | 8/2007 | O'Sullivan | G06F 3/03543 345/163 |
| 2008/0156923 A1 | * | 7/2008 | Burch | B65H 75/4492 242/407 |
| 2014/0128141 A1 | * | 5/2014 | Bontempo | G07F 17/322 463/17 |
| 2015/0371747 A1 | * | 12/2015 | Onitsuka | G06F 3/016 335/220 |

\* cited by examiner

*Primary Examiner* — Temesghen Ghebretinsae
*Assistant Examiner* — Karin Kiyabu
(74) *Attorney, Agent, or Firm* — KIRTON McCONKIE; Evan R. Witt

(57) ABSTRACT

A roller module for a mouse includes a roller, a ratchet assembly and a counterweight assembly. The ratchet assembly and the counterweight assembly are installed in the roller. When the roller is rotated at a slow speed, the magnet blocks in the counterweight assembly and the magnetic ratchet are magnetically attracted by each other. Consequently, a stepped rotation feel is provided. When the roller is rotated at a fast speed, the magnet blocks are moved with the corresponding counterweight blocks in the counterweight assembly and gradually moved away from the magnetic ratchet along a radial direction. Consequently, a non-stepped rotation feel is provided.

12 Claims, 8 Drawing Sheets

1

ROLLER MODULE

FIELD OF THE INVENTION

The present invention relates to a roller module, and more particularly to a roller module for an input device.

BACKGROUND OF THE INVENTION

Generally, a mouse device can be used to control a cursor shown on a display screen of a computer in order to operate the computer. The roller of the mouse is also the button that is the most widely used by the user. For example, the user may rotate the roller to browse web pages or move the cursor, or the user may press the roller to output a middle button signal or switch between different function modes.

For increasing the convenience and comfort of operating the roller, a roller module of an input device is disclosed in Taiwanese Patent No. 1448928. In this roller module, a recess or a hollow slot of a roller is equipped with one or two different toothed surfaces. When a swinging arm is contacted with one of the toothed surfaces, the rotation of the roller generates different stepped rotation feels. Moreover, a hyper-fast roller structure of a mouse device is disclosed in Taiwanese Patent No. M498914. A tooth part and a stopping rod are installed in the roller module. In case that the stopping rod is pushed by a torsion spring, the stopping rod is in close contact with the tooth part. When a button linked with the stopping rod is operated by the user, the operating mode of the roller is switched between a hyper-fast scrolling mode and an ordinary scrolling mode.

Conventionally, the operating mode of the roller in the mouse can be switched in a manual switching manner or an automatic switching manner.

In case that the operating mode of the roller in the mouse is switched in the automatic switching manner, the roller is in the hyper-fast scrolling mode corresponding to the non-stepped rotation feel when the roller is rotated at a fast speed. After the speed of the roller is decreased, the operating mode of the roller is automatically restored to the ordinary scrolling mode corresponding to the stepped rotation feel.

In case that the operating mode of the roller in the mouse is switched in the manual switching manner, the user has to rotate or press a switching button to switch the operating mode of the roller. That is, the method of switching the operating mode in the manual switching manner cannot allow the user to adjust the operating mode in real time according to the usage situation. In other words, the method of switching the operating mode in the manual switching manner is not user-friendly.

Conventionally, in case that the mouse is equipped with the mechanism for switching the operating mode of the roller in the automatic switching manner or the manual switching manner, an actuator such as a motor or an electromagnetic iron is used to drive the associated components of the roller. However, the actuator and the associated structure are usually very complicated and costly, the applications are limited. In addition, since the actuator and the associated structure usually influence the installation of other components, the production yield of the mouse is not satisfied.

In order to overcome the drawbacks of the conventional technologies, it is important to provide a roller module with a simplified structure that can be automatically switched between a hyper-fast scrolling mode and an ordinary scrolling mode to meet the needs of different industries or consumers.

SUMMARY OF THE INVENTION

The present invention provides a roller module with a simplified structure. During the rotation of the roller in the roller module, the roller can be automatically switched between a hyper-fast scrolling mode and an ordinary scrolling mode according to the rotation speed of the roller.

In accordance with an aspect of the present invention, a roller module for a mouse is provided. The roller module includes a roller, a ratchet assembly and a counterweight assembly. The roller includes a first hub shell and a second hub shell. The first hub shell includes a first axle hole. The second hub shell includes a second axle hole and two position-guiding structures. The two position-guiding structures are arranged in a radial direction and opposed to each other. The second axle hole is aligned with the first axle hole. The two position-guiding structures are formed on an inner surface of the second hub shell. The second hub shell is combined with the first hub shell. The ratchet assembly includes a fixed shaft and a magnetic ratchet. In addition, two opposite ends of the fixed shaft are respectively penetrated through the first axle hole and the second axle hole. Consequently, the roller is rotatable relative to the ratchet assembly. The magnetic ratchet is sheathed around the fixed shaft. The counterweight assembly includes two counterweight blocks and two magnet blocks. The two counterweight blocks are respectively and slidably installed in the two position-guiding structures. Each of the two counterweight blocks includes a ratchet receiving groove. An entrance of the ratchet receiving groove is aligned with the magnetic ratchet. A portion of the magnetic ratchet is accommodated within the ratchet receiving groove. Each of the two counterweight blocks is not interfered with the magnetic ratchet. Each of the two magnet blocks is installed in the corresponding ratchet receiving groove. When the roller is rotated at a slow speed, each of the two magnet blocks and the magnetic ratchet are magnetically attracted by each other. Consequently, a stepped rotation feel is provided. When the roller is rotated at a fast speed, each of the two magnet blocks is moved with the corresponding counterweight block and gradually moved away from the magnetic ratchet along the radial direction. Consequently, a non-stepped rotation feel is provided.

In an embodiment, the roller module further includes a clutch assembly that is installed in the roller along the axial direction, and the clutch assembly includes an elastic element and a push element. A first end of the elastic element is fixed on an inner surface of the roller or fixed on the fixed shaft. A second end of the elastic element is connected with the push element. The push element pushes a sidewall of each of the two counterweight blocks along a direction deviated from the axial direction. When the roller is rotated at the fast speed, the push element pushes the counterweight blocks and assists movement of the counterweight blocks away from the magnetic ratchet along the direction deviated from the axial direction in response to an elastic force from the elastic element.

In an embodiment, the first hub shell includes a first axle tube, and the second hub shell includes a second axle tube. The first axle hole is formed in the first axle tube. The second axle hole is formed in the second axle tube.

In an embodiment, the ratchet assembly further includes two bearing mechanisms. The two bearing mechanisms are sheathed around the fixed shaft and respectively located beside two opposite sides of the magnetic ratchet. The two bearing mechanisms are respectively fixed in the first axle tube and the second axle tube. Consequently, roller is rotatable relative to the ratchet assembly.

In an embodiment, the elastic element is a spring, and the spring is sheathed around the first axle tube.

In an embodiment, the first hub shell further includes a position-limiting groove. The position-limiting groove is formed in an inner surface of the first hub shell and arranged around the first axle tube. The spring is accommodated and fixed in the position-limiting groove.

In an embodiment, the push element is a push plate, and the push plate includes a base portion, a push portion and an opening. The push portion is connected with the base portion. The opening runs through the push plate. The base portion is connected with the second end of the elastic element. The push portion is tapered in a direction toward the opening. The push portion has a first slant.

In an embodiment, a sidewall of an entrance of each ratchet receiving groove aligned with the push element is provided with a second slant surface, and the second slant surface is aligned with the first slant surface. When the roller is rotated at the slow speed, the first slant surface and the second slant surface are contacted with each other along the direction deviated from the axial direction.

In an embodiment, the roller module further includes a base member, and the base member includes a roller receiving groove and two support mechanisms. The two support mechanisms are located beside two opposite sides of an entrance of the roller receiving groove. The roller is accommodated within the roller receiving groove, and two ends of the fixed shaft are respectively fixed on the two support mechanisms.

In an embodiment, the second hub shell further includes a ring-shaped structure. The ring-shaped structure is circumferentially arranged on the second hub shell. The roller is rotated by a user through the ring-shaped structure.

In an embodiment, the magnetic ratchet includes plural convex structures and plural concave structures, which are alternately and discretely arranged.

In an embodiment, a magnetic pole of a first magnet block of the two magnet blocks facing the magnetic ratchet and a magnetic pole of a second magnet block of the two magnet blocks facing the magnetic ratchet are opposite to each other.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
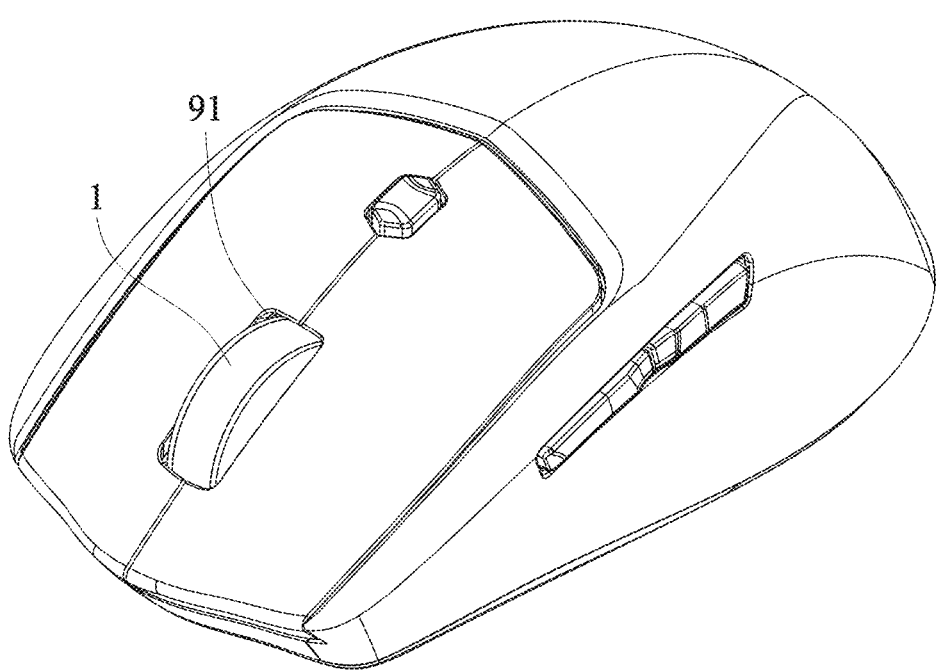
FIG. 1A is a schematic perspective view illustrating a mouse with a roller module according to an embodiment of the present invention.
Figure 1B:
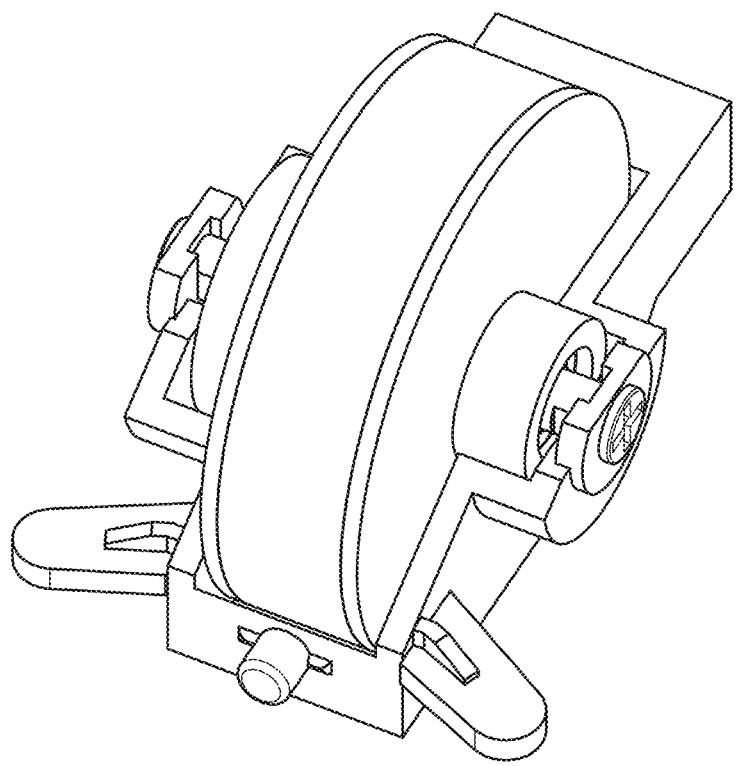
FIG. 1B is a schematic perspective view illustrating the roller module according to the embodiment of the present invention.

Please refer to FIGS. 1A and 1B. FIG. 1A is a schematic perspective view illustrating a mouse with a roller module according to an embodiment of the present invention. FIG. 1B is a schematic perspective view illustrating the roller module according to the embodiment of the present invention. As shown in FIG. 1A, an operating end of the mouse 9 includes an operating hole 91. The roller module 1 is installed in the mouse 9. A portion of a roller of the roller module 1 is exposed to the operating hole 91. Consequently, the scroll wheel can be rotated or pressed by the user. When the roller is rotated or pressed by the user, the cursor shown on the computer screen is controlled, or the web pages shown on the computer screen is scrolled upwardly or downwardly.

Figure 2A:
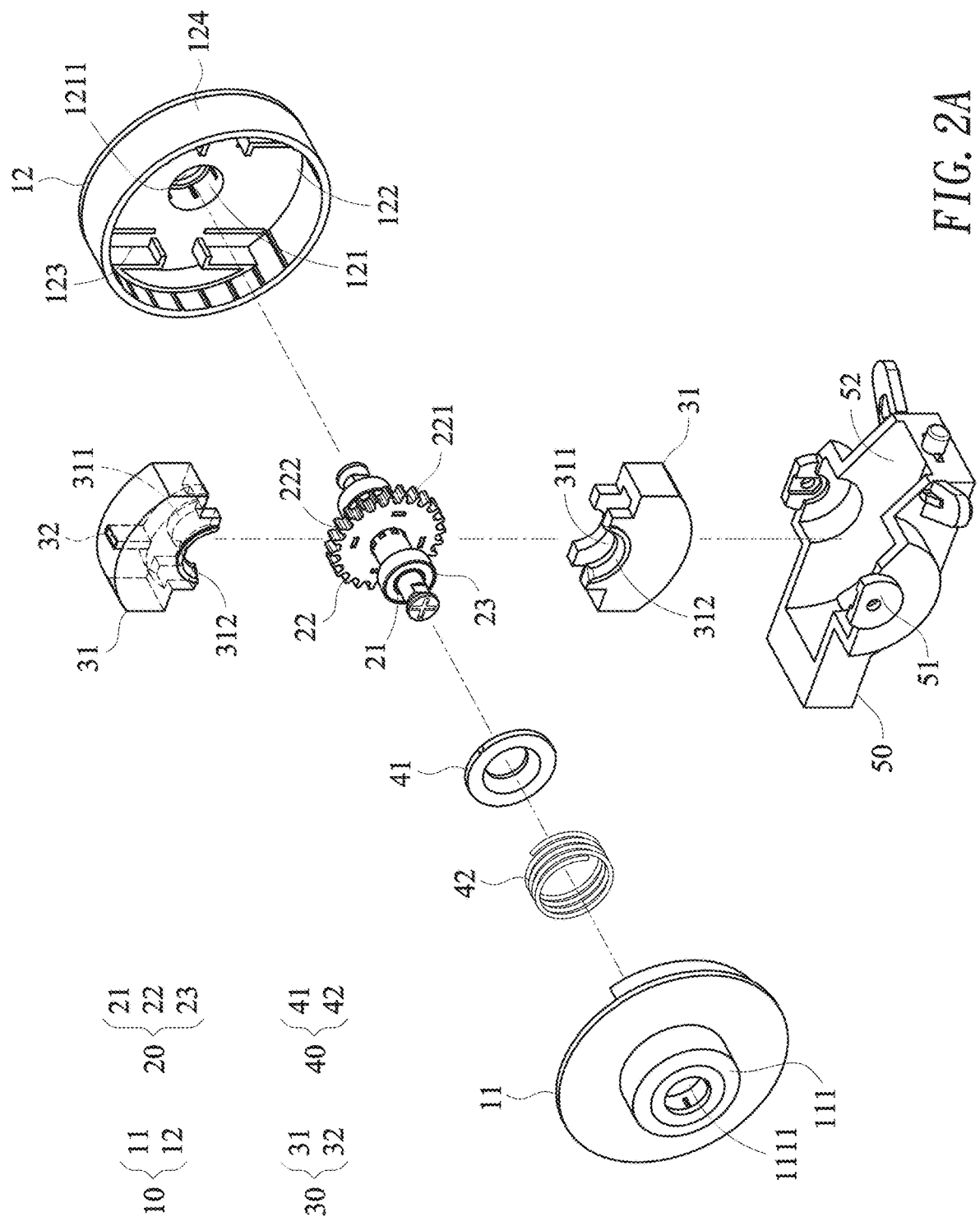
FIG. 2A is a schematic exploded view illustrating the roller module according to the embodiment of the present invention and taken along a viewpoint.
Figure 2B:
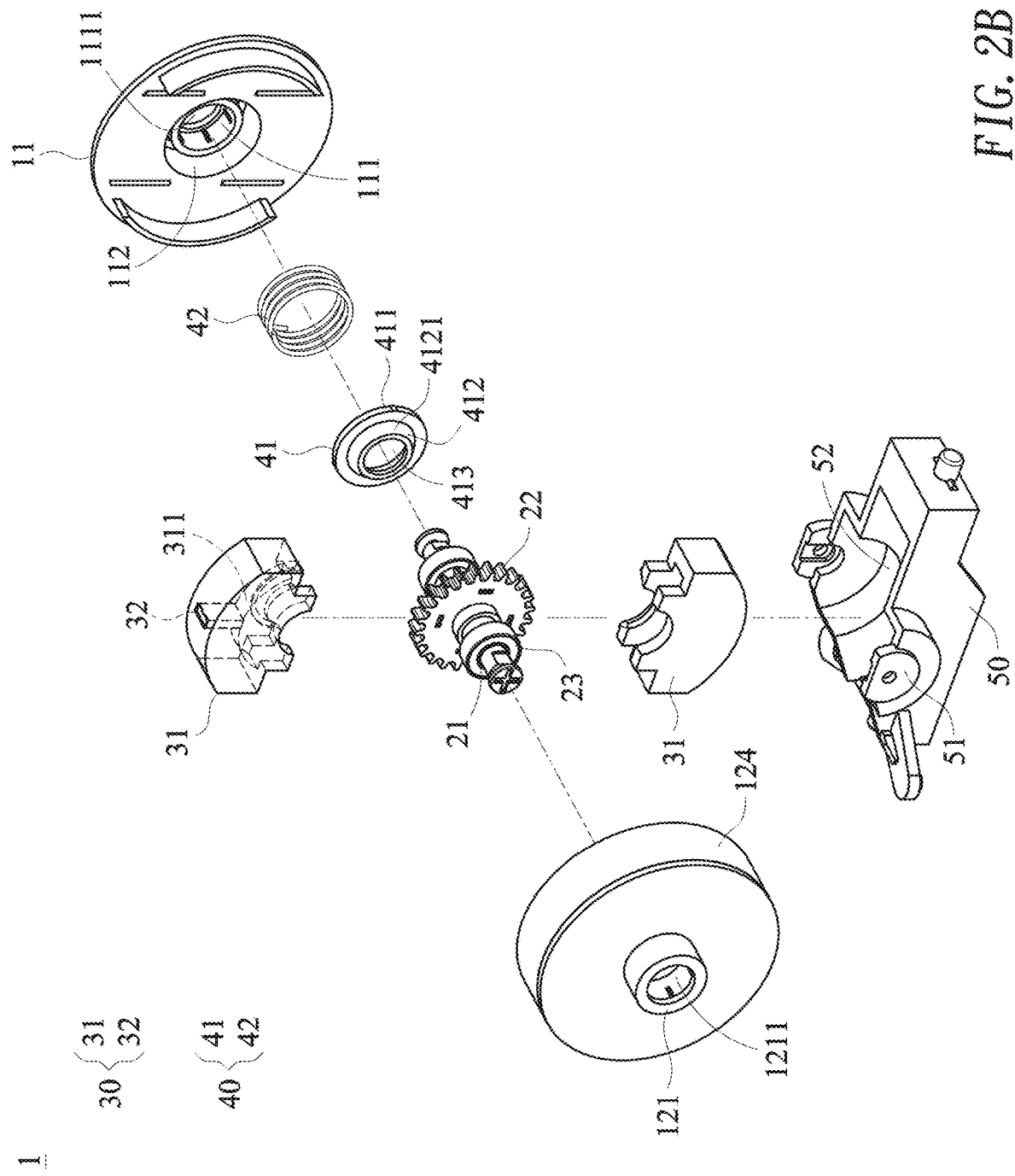
FIG. 2B is a schematic exploded view illustrating the roller module according to the embodiment of the present invention and taken along another viewpoint.

Please refer to FIGS. 2A and 2B. FIG. 2A is a schematic exploded view illustrating the roller module according to the embodiment of the present invention and taken along a viewpoint. FIG. 2B is a schematic exploded view illustrating the roller module according to the embodiment of the present invention and taken along another viewpoint. In this embodiment, the roller module 1 includes a roller 10, a ratchet assembly 20, a counterweight assembly 30, a clutch assembly 40 and a base member 50.

The roller 10 includes a first hub shell 11 and a second hub shell 12. The first hub shell 11 and the second hub shell 12 are combined with each other. Consequently, an accommodation space is formed between the first hub shell 11 and the second hub shell 12 to accommodate the ratchet assembly 20, the counterweight assembly 30 and the clutch assembly 40.

The first hub shell 11 has a first axle tube 111 and a position-limiting groove 112. The position-limiting groove 112 is arranged around the first axle tube 111. In addition, the first axle tube 111 has a first axle hole 1111.

The second hub shell 12 includes a second axle tube 121, two position-guiding structures 122 and 123 and a ring-shaped structure 124. The second axle tube 121 has a second axle hole 1211 corresponding to the first axle hole 1111. The two position-guiding structures 122 and 123 are formed on an inner surface of the second hub shell 12. In addition, the two position-guiding structures 122 and 123 are radially arranged on the inner surface of the second hub shell 12 and opposed to each other. In this embodiment, the position-guiding structures 122 and 123 are position-guiding recesses and respectively located at two opposite sides of the second axle tube 121.

The ring-shaped structure 124 is circumferentially arranged on the second hub shell 12. Consequently, the user can press or rotate the roller 10 through the ring-shaped structure 124.

In this embodiment, the ring-shaped structure 124 is disposed on the second hub shell 12. It is noted that numerous modifications and alterations may be made while retaining the teachings of the invention. For example, in another embodiment, the ring-shaped structure 124 is disposed on the first hub shell 11. Alternatively, the ring-shaped structure 124 is an independent component, and the first hub shell 11 and the second hub shell 12 are combined together through the ring-shaped structure 124.

The ratchet assembly 20 includes a fixed shaft 21, a magnetic ratchet 22 and two bearing mechanisms 23. The magnetic ratchet 22 and two bearing mechanisms 23 are sheathed around and fixed on the fixed shaft 21. In addition, the two bearing mechanisms 23 are respectively located beside two opposite sides of the magnetic ratchet 22. The magnetic ratchet 22 includes plural convex structures 221 and plural concave structures 222, which are alternately and discretely arranged. The bearing mechanisms 23 are mechanical bearings.

When the first hub shell 11 and the second hub shell 12 are combined together, the two opposite ends of the fixed shaft 21 are respectively penetrated through the first axle hole 1111 and the second axle hole 1211, and the bearing mechanisms 23 are respectively fixed in the first axle tube 111 and the second axle tube 121. Consequently, the roller 10 can be rotated relative to the ratchet assembly 20.

In this embodiment, the bearing mechanisms 23 of the ratchet assembly 20 is fixed in the first axle tube 111 and the second axle tube 121, and thus the roller 10 is rotatable relative to the ratchet assembly 20. It is noted that numerous modifications and alterations may be made while retaining the teachings of the invention. For example, in another embodiment, the ratchet assembly 20 is not equipped with the bearing mechanisms 23. That is, the two opposite ends of the fixed shaft 21 respectively pass through the first axle hole 1111 and the second axle hole 1211 only. Furthermore, the contact parts between the fixed shaft 21 and the axle holes 1111 and 1211 are added or replaced with self-lubricating material. For example, the self-lubricating material is polyoxymethylene (POM). Alternatively, the fixed shaft 21 is polished and oiled. Since the friction between the fixed shaft 21 and the axle holes 1111 and 1211 is reduced, the roller 10 can be rotated relative to the ratchet assembly 20.

The counterweight assembly 30 includes two counterweight blocks 31 and two magnet blocks 32. The two counterweight blocks 31 are slidably installed in the two position-guiding structures 122 and 123, respectively. In addition, the movable ranges of the counterweight blocks 31 are limited by the position-guiding structures 122 and 123. Consequently, the interference between the counterweight blocks 31 and the magnetic ratchet 22 will be avoided.

In this embodiment, the position-guiding structures 122 and 123 are position-guiding recesses. It is noted that numerous modifications and alterations may be made while retaining the teachings of the invention. For example, in another embodiment, the position-guiding structures 122 and 123 are position-guiding ribs that are extended in the radial direction. In addition, the side of each counterweight block 31 facing the sidewall of the corresponding position-guiding rib is equipped with a guiding recess. Due to the engagement between the guiding recess and the corresponding position-guiding rib, the counterweight block 31 can be moved back and forth in the radial direction. Each counterweight block 31 includes a ratchet receiving groove 311. The entrance of the ratchet receiving groove 311 is aligned with the magnetic ratchet 22 to accommodate a portion of the magnetic ratchet 22. In this embodiment, a sidewall of the entrance of the ratchet receiving groove 311 aligned with the clutch assembly 40 (i.e., the side facing the first hub shell 11) is provided with a second slant surface 312.

The two magnet blocks 32 are respectively installed in the two ratchet receiving grooves 311. Each of the two magnet blocks 32 and the magnetic ratchet 22 are magnetically attracted by each other in response to a magnetic attraction force. In an embodiment, the magnet blocks 32 are contacted with or extremely close to the convex structures 221 of the magnetic ratchet 22.

The clutch assembly 40 is installed in the roller 10 along the axial direction. The clutch assembly 40 includes an elastic element 42 and a push element 41. A first end of the elastic element 42 is fixed on the inner surface of the roller 10. A second end of the elastic element 42 is connected with the push element 41. The push element 41 can push the sidewalls of the counterweight blocks 31 along the direction deviated from the axial direction. In this embodiment, the clutch assembly 40 is located beside the first hub shell 11. The elastic element 42 is a spring. The elastic element 42 is sheathed around the first axle tube 111 and received and fixed in the position-limiting groove 112, which is formed in the inner surface of the first hub shell 11. The push element 41 is a push plate. The push plate includes a base portion 411, a push portion 412 and an opening 413. The push portion 412 is connected with the base portion 411. The opening 413 runs through the push plate. The base portion 411 of the push plate is connected with the second end of the elastic element 42. The push portion 412 of the push element 41 is tapered in a direction toward the opening 413 of the push element 41. In addition, the push portion 412 of the push element 41 has a first slant surface 4121. The first slant surface 4121 is aligned with the second slant surfaces 312 on the sidewalls of the counterweight blocks 31. The opening 413 is aligned with the fixed shaft 21. An end of the fixed shaft 21 is penetrated through the opening 413.

In the above embodiment, the first end of the elastic element 42 of the clutch assembly 40 is fixed on the inner surface of the roller 10. It is noted that numerous modifications and alterations may be made while retaining the teachings of the invention. For example, in another embodiment, the elastic element 42 is directly locked and fixed on the fixed shaft 21.

The base member 50 includes a roller receiving groove 52 and two support mechanisms 51. The two support mechanisms 51 are located beside two opposite sides of the entrance of the roller receiving groove 52. The roller receiving groove 52 is used for accommodating the roller 10. The two ends of the fixed shaft 21 of the ratchet assembly 20 are respectively fixed on the two support mechanisms 51. In this embodiment, the two ends of the fixed shaft 21 of the ratchet assembly 20 are respectively fixed on the two support mechanisms 51 in a screwing manner.

Figure 3A:
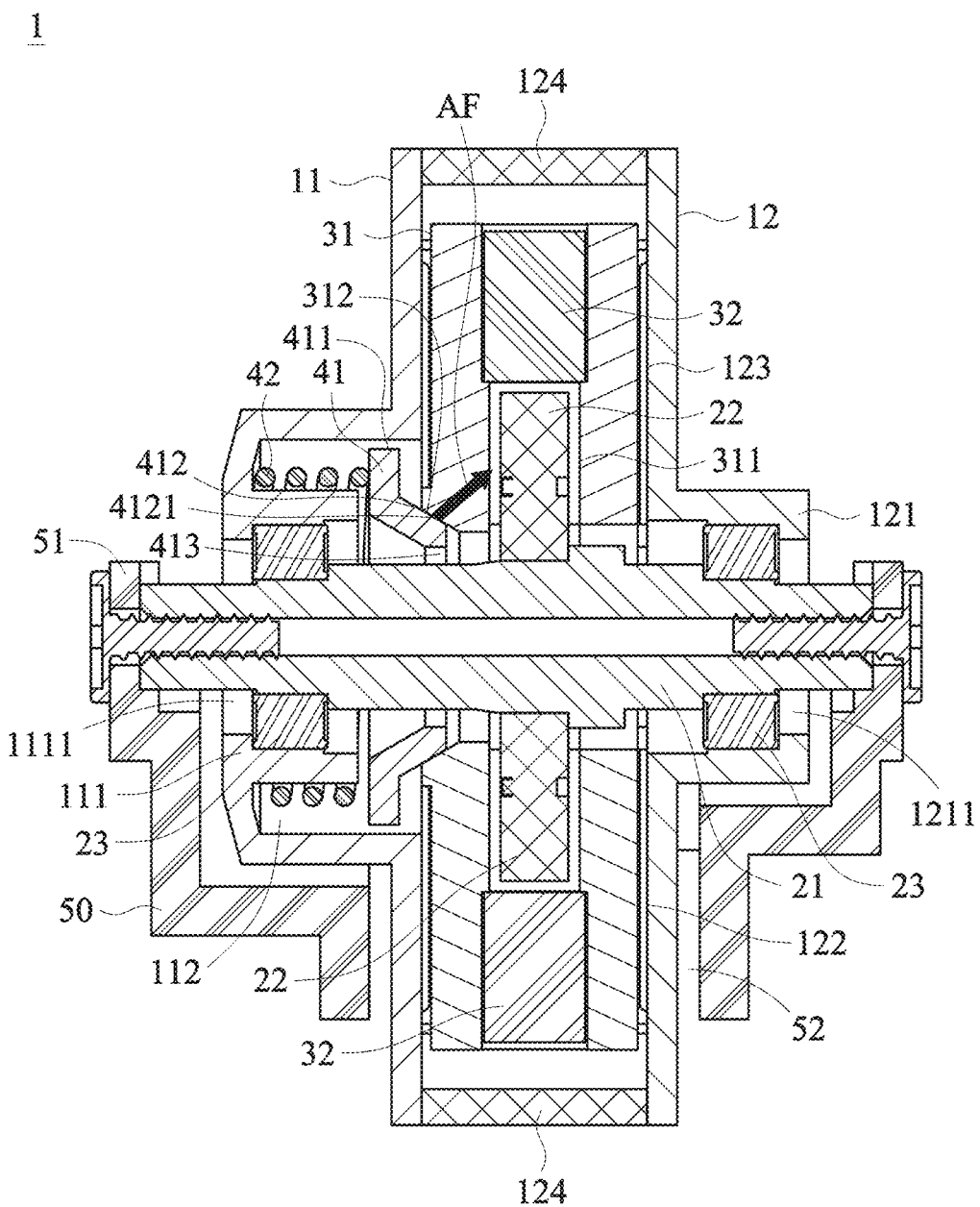
FIGS. 3A and 3B are schematic cross-sectional views illustrating the operations of the roller module according to the embodiment of the present invention.
Figure 3B:
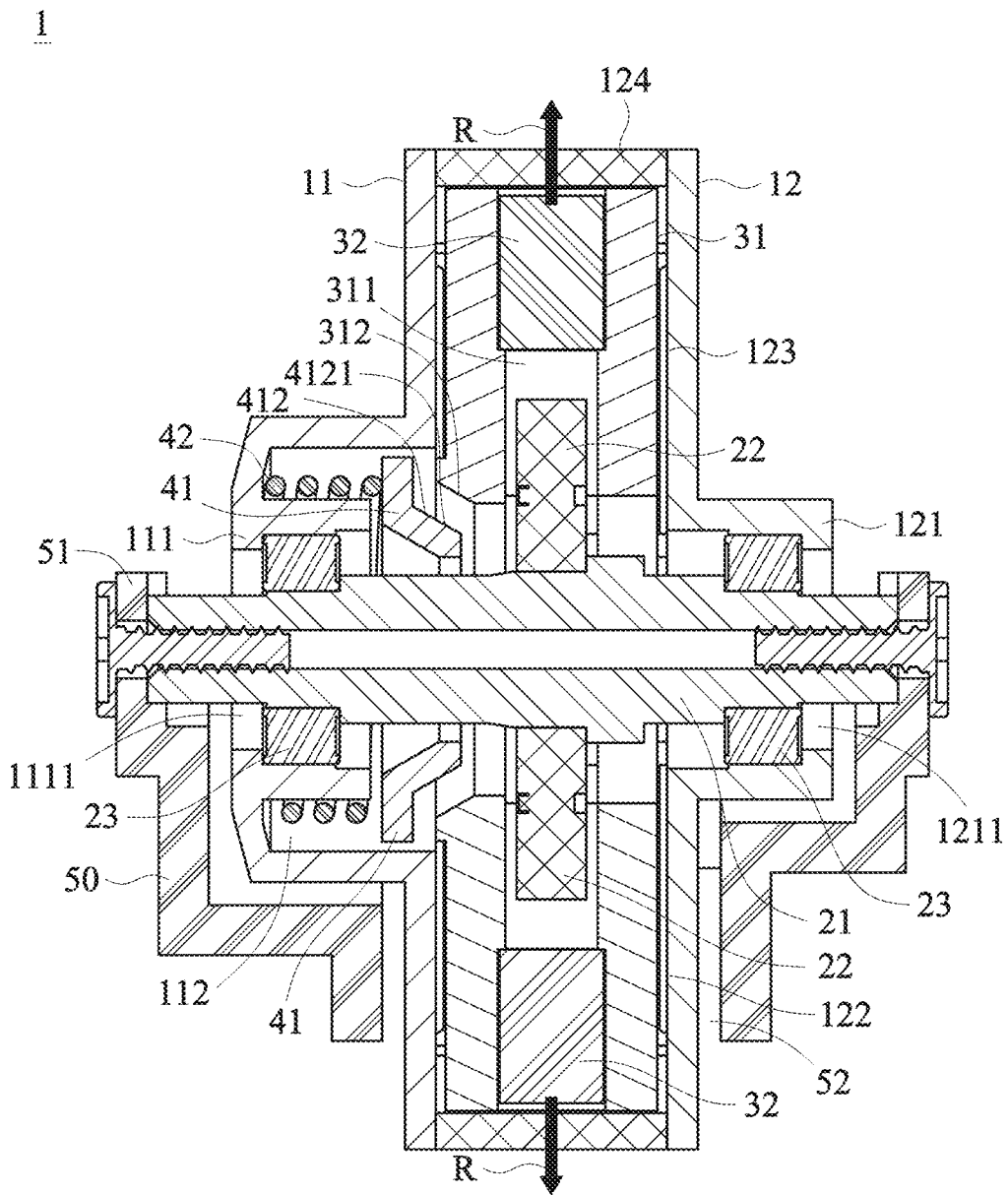

Please refer to FIGS. 3A and 3B. FIGS. 3A and 3B are schematic cross-sectional views illustrating the operations of the roller module according to the embodiment of the present invention.

In the situation of FIG. 3A, the roller 10 is rotated at a slow speed. That is, the roller 10 is operated in an ordinary scrolling mode. As the roller 10 is rotated, the counterweight blocks 31 within the position-guiding structures 122 and 123 are synchronously rotated about the magnetic ratchet 22. Since the two magnet blocks 32 in the counterweight blocks 31 and the magnetic ratchet 22 are magnetically attracted by each other, the counterweight blocks 31 are close to the magnetic ratchet 22, and a portion of the magnetic ratchet 22 is accommodated within the counterweight blocks 31. Under this circumstance, the first slant surface 4121 of the clutch assembly 40 and the second slant surfaces 312 of the counterweight blocks 31 are contacted with each other along the direction deviated from the axial direction. In response to an elastic force from the elastic element 42, the push element 41 provides a pushing force AF to the counterweight blocks 31 along the direction deviated from the axial direction.

As mentioned above, the plural convex structures 221 and plural concave structures 222 of the magnetic ratchet 22 are alternately and discretely arranged. In the ordinary scrolling mode, the counterweight blocks 31 are close to the magnetic ratchet 22. As the roller 10 is rotated in the ordinary scrolling mode, the distance between the magnetic ratchet 22 and each of the counterweight blocks 31 is continuously changed, and thus the magnetic attraction force is continuously changed. Consequently, the rotation of the roller 10 provides the feedback of a stepped rotation feel.

In the situation of FIG. 3B, the roller 10 is rotated at a fast speed. As the centrifugal force of the roller 10 is gradually increased, the magnet blocks 32 are moved with the counterweight blocks 31 and gradually moved away from the magnetic ratchet 22 along the radial direction R. Consequently, upon the rotation of the roller 10, the feedback of the stepped rotation feel is gradually decreased. Furthermore, when the centrifugal force of the roller 10 and the component force of the pushing force AF (i.e., the force deviated from the axial direction) in the radial direction R is greater than the magnetic attraction force between the magnet block 32 and the magnetic ratchet 22, the clutch assembly 40 assists the counterweight blocks 31 to quickly drive the movement of the magnet block 32 away from the magnetic ratchet 22. Consequently, the magnetic attraction force between the magnet block 32 and the magnetic ratchet 22 is quickly attenuated. Under this circumstance, the rotation of the roller 10 does not provide the feedback of the stepped rotation feel. As a consequently, the operating mode of the roller 10 is switched to the hyper-fast scrolling mode automatically and quickly.

When the roller 10 is restored from the fast rotation status (i.e., the hyper-fast scrolling mode) to the slow rotation status (i.e., the ordinary scrolling mode), the counterweight blocks 31 are returned to their original positions in response to the magnetic attraction forces between the magnet blocks 32 and the magnetic ratchet 22. When the counterweight blocks 31 are returned to the positions close to the magnetic ratchet 22, the magnetic attraction force between each of the counterweight blocks 31 and magnetic ratchet 22 and is continuously changed upon the rotation of the roller 10. Consequently, the rotation of the roller 10 provides the feedback of the stepped rotation feel again.

Figure 4:
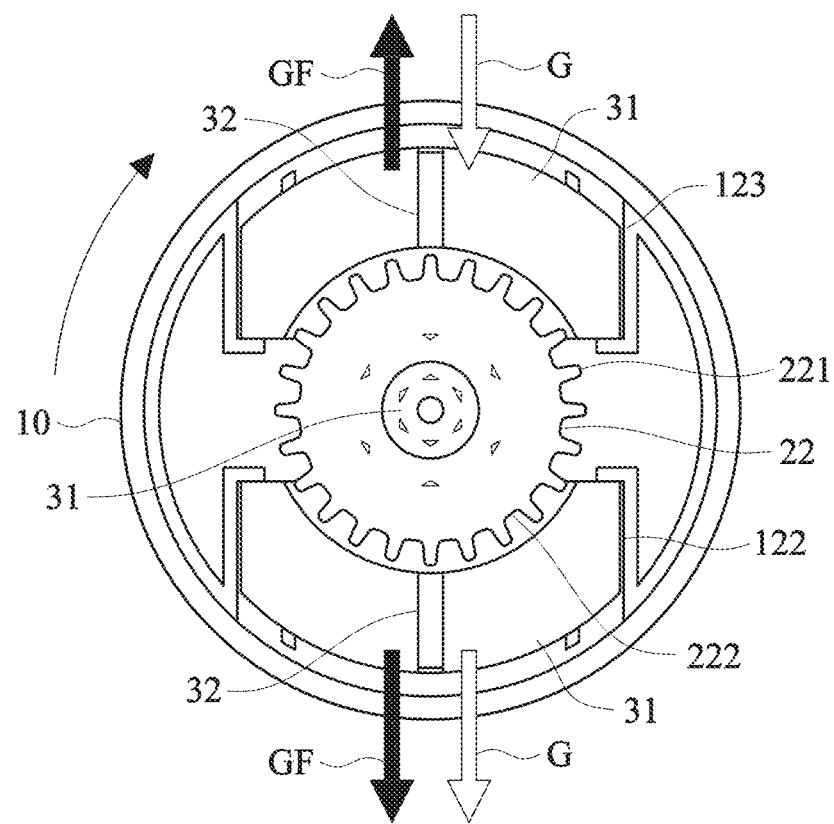
FIGS. 4 and 5 are schematic cross-sectional views illustrating the operations of the roller module according to the embodiment of the present invention and taken along the radial direction.
Figure 5:
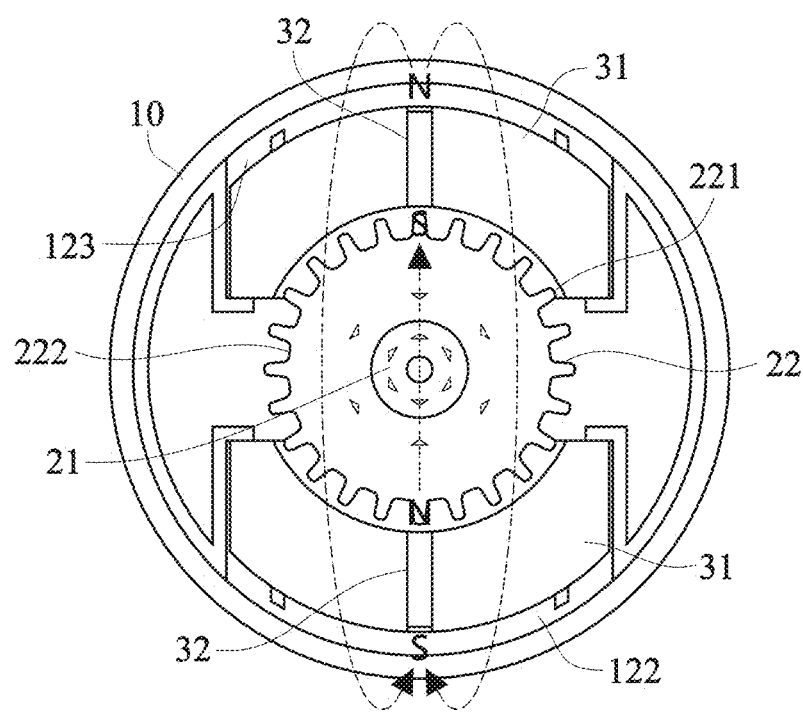

Please refer to FIGS. 4 and 5. FIGS. 4 and 5 are schematic cross-sectional views illustrating the operations of the roller module according to the embodiment of the present invention and taken along the radial direction.

Please refer to the situation of FIG. 4. When the rotating speed of the roller 10 is changed from the ordinary speed to the fast speed, the centrifugal force GF of the roller 10 is gradually increased. As the counterweight assembly 30 is rotated, the lower counterweight block 31 (e.g., the counterweight block 31 in the position-guiding structure 122 shown in the drawing) is subjected to both of the centrifugal force GF and the gravity G. In comparison with the upper counterweight block 31 (e.g., the counterweight block 31 in the position-guiding structure 123 shown in the drawing), the lower counterweight block 31 will be moved away from the magnetic ratchet 22 along the radial direction R (as shown in FIG. 3B) earlier in response to the resultant force of the centrifugal force GF and the gravity G. That is, if the rotating speed is identical, the upper counterweight block 31 will not be moved away from the magnetic ratchet 22 along the radial direction R (as shown in FIG. 3B). Consequently, the upper counterweight block 31 and the lower counterweight block 31 are not synchronously detached from the magnetic ratchet 22.

On the other hand, when the rotating speed of the roller 10 is changed from the fast speed to the ordinary speed, the centrifugal force GF of the roller 10 is gradually decreased. In response to the resultant force of the magnetic attraction force between the magnetic ratchet 22 and the magnet block 32 and the gravity G, the upper counterweight block 31 (e.g., the counterweight block 31 in the position-guiding structure 123 shown in the drawing) will be close to the magnetic ratchet 22 along the radial direction R (as shown in FIG. 3B) earlier. Consequently, the upper counterweight block 31 and the lower counterweight block 31 are not synchronously returned to their original positions.

Please refer to the situation of FIG. 5. The magnetic pole of the magnet block 32 in the upper counterweight block 31 (e.g., the counterweight block 31 in the position-guiding structure 123 shown in the drawing) facing the magnetic ratchet 22 and the magnetic pole of the magnet block 32 in the lower counterweight block 31 (e.g., the counterweight block 31 in the position-guiding structure 122 shown in the drawing) facing the magnetic ratchet 22 are opposite to each other. For example, in an embodiment, the S pole of the upper magnet block 32 faces the magnetic ratchet 22, and the N pole of the lower magnet block 32 faces the magnetic ratchet 22. Consequently, one magnetic attraction force between the magnet block 32 in each of the two counterweight blocks 31 and the magnetic ratchet 22 is generated, and another magnetic attraction force between the two magnet blocks 32 in the two counterweight blocks 31 is also generated. In response to the resultant force of the two magnetic attraction force, the asynchronous detachment condition or the asynchronous returning condition will be effectively alleviated.

For example, when the rotating speed of the roller 10 is changed from the ordinary speed to the fast speed, the centrifugal force GF of the roller 10 is gradually increased. However, the lower counterweight block 31 (e.g., the counterweight block 31 in the position-guiding structure 122 shown in the drawing) is attracted by both of the magnetic attraction force between the magnet block 32 and the magnetic ratchet 22 and the magnetic attraction force between the two magnet blocks 32. Consequently, a larger centrifugal force GF is required to allow the lower counterweight block 31 to be moved away from the magnetic ratchet 22 in the radial direction R (as shown in FIG. 3B). At the moment when the lower counterweight block 31 is moved away from the magnetic ratchet 22, the magnetic attraction force on the magnet blocks 32 in the upper counterweight block 31 will be decreased suddenly. Consequently, the upper counterweight block 31 is moved away from the magnetic ratchet 22 under the action of the larger centrifugal force. In other words, the upper counterweight block 31 and the lower counterweight block 31 are substantially detached from the magnetic ratchet 22 synchronously.

On the other hand, when the rotating speed of the roller 10 is changed from the fast speed to the ordinary speed, the centrifugal force GF of the roller 10 is gradually decreased. If the upper counterweight block 31 (e.g., the counterweight block 31 in the position-guiding structure 123 shown in the drawing) is returned to its original position first, the magnet block 32 in the lower counterweight block 31 is attracted by both of the magnetic attraction force between the magnet block 32 and the magnetic ratchet 22 and the magnetic attraction force between the two magnet blocks 32. Consequently, as the centrifugal force GF is gradually decreased, the lower counterweight block 31 is moved toward the magnetic ratchet 22. In other words, the upper counterweight block 31 and the lower counterweight block 31 are substantially returned to their original positions synchronously.

From the above descriptions, the present invention provides the roller module. In comparison with the complicated roller structure in the conventional roller module, the structure of the roller module of the present invention is simplified. When the rotating speed of roller is changed, the magnetic attraction distance between the magnet block in each counterweight block and the magnetic ratchet is correspondingly changed in response to the centrifugal force. Consequently, the rotation of the roller provides the stepped rotation feel. If the centrifugal force is greater than the magnetic attraction force, the clutch assembly arranged along the axial direction assists the counterweight blocks to quickly drive the movement of the magnet block away from the magnetic ratchet. Consequently, the operating mode of the roller is automatically and quickly switched to the hyper-fast scrolling mode corresponding to the non-stepped rotation feel. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A roller module for a mouse, the roller module comprising:
    a roller comprising a first hub shell and a second hub shell, wherein the first hub shell comprises a first axle hole, the second hub shell comprises a second axle hole and two position-guiding structures, wherein the two position-guiding structures are arranged in a radial direction and opposed to each other, the second axle hole is aligned with the first axle hole, the two position-guiding structures are formed on an inner surface of the second hub shell, and the second hub shell is combined with the first hub shell;
    a ratchet assembly comprising a fixed shaft and a magnetic ratchet, wherein two opposite ends of the fixed shaft are respectively penetrated through the first axle hole and the second axle hole, so that the roller is rotatable relative to the ratchet assembly, wherein the magnetic ratchet is sheathed around the fixed shaft; and
    a counterweight assembly comprising two counterweight blocks and two magnet blocks, wherein the two counterweight blocks are respectively and slidably installed in the two position-guiding structures, each of the two counterweight blocks comprises a ratchet receiving groove, an entrance of the ratchet receiving groove is aligned with the magnetic ratchet, a portion of the magnetic ratchet is accommodated within the ratchet receiving groove, and each of the two counterweight blocks is not interfered with the magnetic ratchet, wherein each of the two magnet blocks is installed in the corresponding ratchet receiving groove,
    wherein when the roller is rotated at a slow speed, each of the two magnet blocks and the magnetic ratchet are magnetically attracted by each other, so that a stepped rotation feel is provided,
    wherein when the roller is rotated at a fast speed, each of the two magnet blocks is moved with the corresponding counterweight block and gradually moved away from the magnetic ratchet along the radial direction, so that a non-stepped rotation feel is provided.

2. The roller module according to claim 1, wherein the roller module further comprises a clutch assembly that is installed in the roller along an axial direction, and the clutch assembly comprises an elastic element and a push element, wherein a first end of the elastic element is fixed on an inner surface of the roller or fixed on the fixed shaft, a second end of the elastic element is connected with the push element, and the push element pushes a sidewall of each of the two counterweight blocks along a direction deviated from the axial direction, wherein when the roller is rotated at the fast speed, the push element pushes the counterweight blocks and assists movement of the counterweight blocks away from the magnetic ratchet along the direction deviated from the axial direction in response to an elastic force from the elastic element.

3. The roller module according to claim 2, wherein the first hub shell comprises a first axle tube, and the second hub shell comprises a second axle tube, wherein the first axle hole is formed in the first axle tube, and the second axle hole is formed in the second axle tube.

4. The roller module according to claim 3, wherein the ratchet assembly further comprises two bearing mechanisms, wherein the two bearing mechanisms are sheathed around the fixed shaft and respectively located beside two opposite sides of the magnetic ratchet, and the two bearing mechanisms are respectively fixed in the first axle tube and the second axle tube, so that the roller is rotatable relative to the ratchet assembly.

5. The roller module according to claim 3, wherein the elastic element is a spring, and the spring is sheathed around the first axle tube.

6. The roller module according to claim 5, wherein the first hub shell further comprises a position-limiting groove, wherein the position-limiting groove is formed in an inner surface of the first hub shell and arranged around the first axle tube, and the spring is accommodated and fixed in the position-limiting groove.

7. The roller module according to claim 2, wherein the push element is a push plate, and the push plate includes a base portion, a push portion and an opening, wherein the push portion is connected with the base portion, the opening runs through the push plate, the base portion is connected with the second end of the elastic element, the push portion is tapered in a direction toward the opening, and the push portion has a first slant surface.

8. The roller module according to claim 7, wherein a sidewall of an entrance of each ratchet receiving groove aligned with the push element is provided with a second slant surface, and the second slant surface is aligned with the first slant surface, wherein when the roller is rotated at the slow speed, the first slant surface and the second slant surface are contacted with each other along the direction deviated from the axial direction.

9. The roller module according to claim 1, wherein the roller module further comprises a base member, and the base member comprises a roller receiving groove and two support mechanisms, wherein the two support mechanisms are located beside two opposite sides of an entrance of the roller receiving groove, the roller is accommodated within the roller receiving groove, and two ends of the fixed shaft are respectively fixed on the two support mechanisms.

10. The roller module according to claim 1, wherein the second hub shell further comprises a ring-shaped structure, wherein the ring-shaped structure is circumferentially arranged on the second hub shell, and the roller is rotated by a user through the ring-shaped structure.

11. The roller module according to claim 1, wherein the magnetic ratchet comprises plural convex structures and plural concave structures, which are alternately and discretely arranged.

12. The roller module according to claim 1, wherein a magnetic pole of a first magnet block of the two magnet blocks facing the magnetic ratchet and a magnetic pole of a second magnet block of the two magnet blocks facing the magnetic ratchet are opposite to each other.

* * * * *